July 2, 1968  H. H. BASCOM  3,391,043
METHOD AND APPARATUS FOR MAKING NON-WOVEN FABRICS
Filed May 20, 1963  10 Sheets-Sheet 1

INVENTOR.
Hollis H. Bascom
BY
Fryer & Tjensvold
Attorneys

July 2, 1968 H. H. BASCOM 3,391,043
METHOD AND APPARATUS FOR MAKING NON-WOVEN FABRICS
Filed May 20, 1963 10 Sheets-Sheet 2
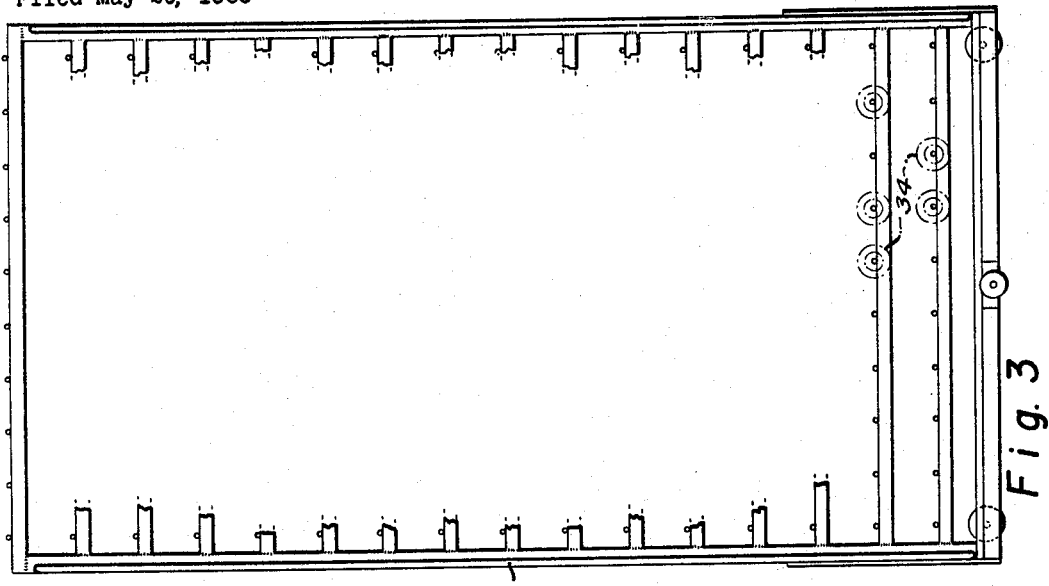
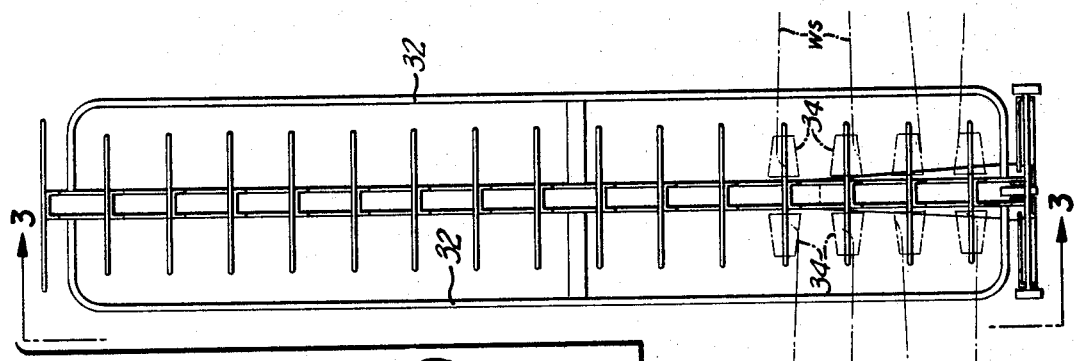
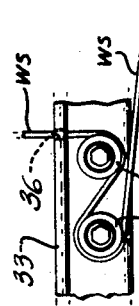
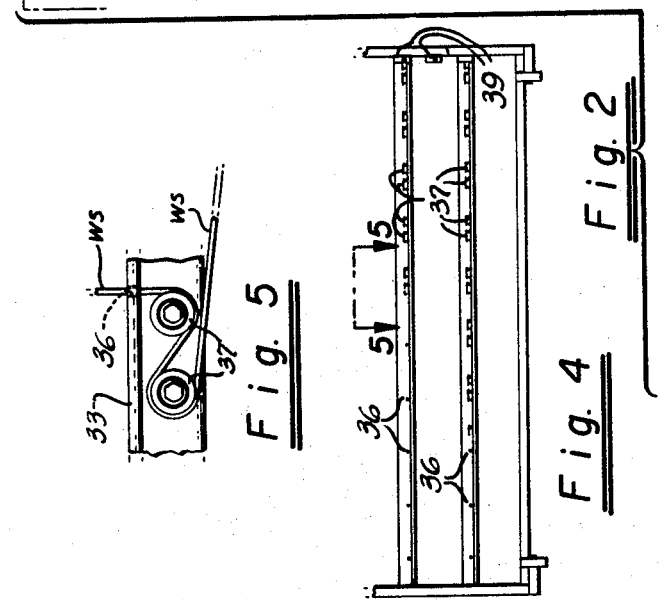
INVENTOR.
Hollis H. Bascom
BY
*Fryer + Tjensvold*
Attorneys

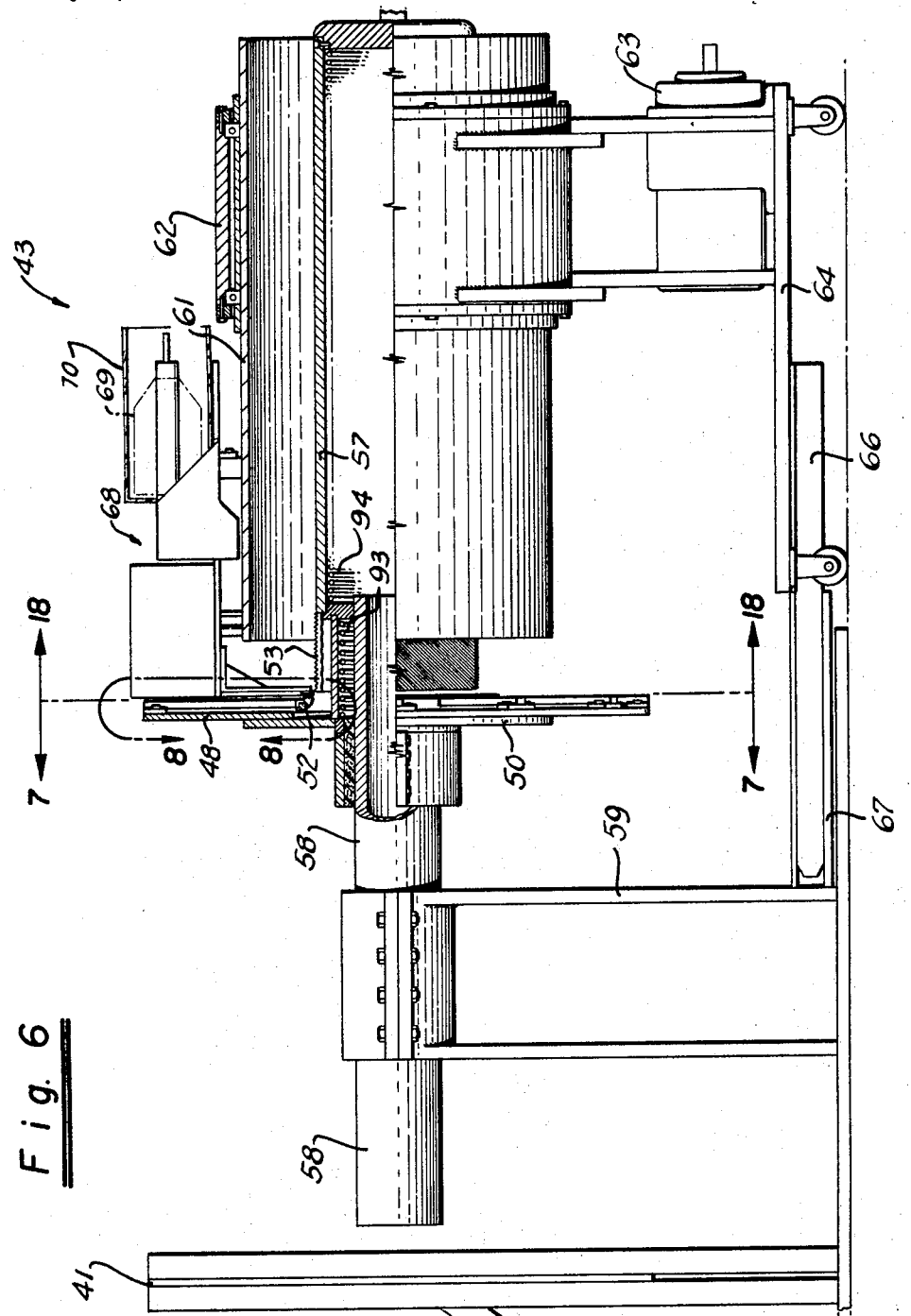

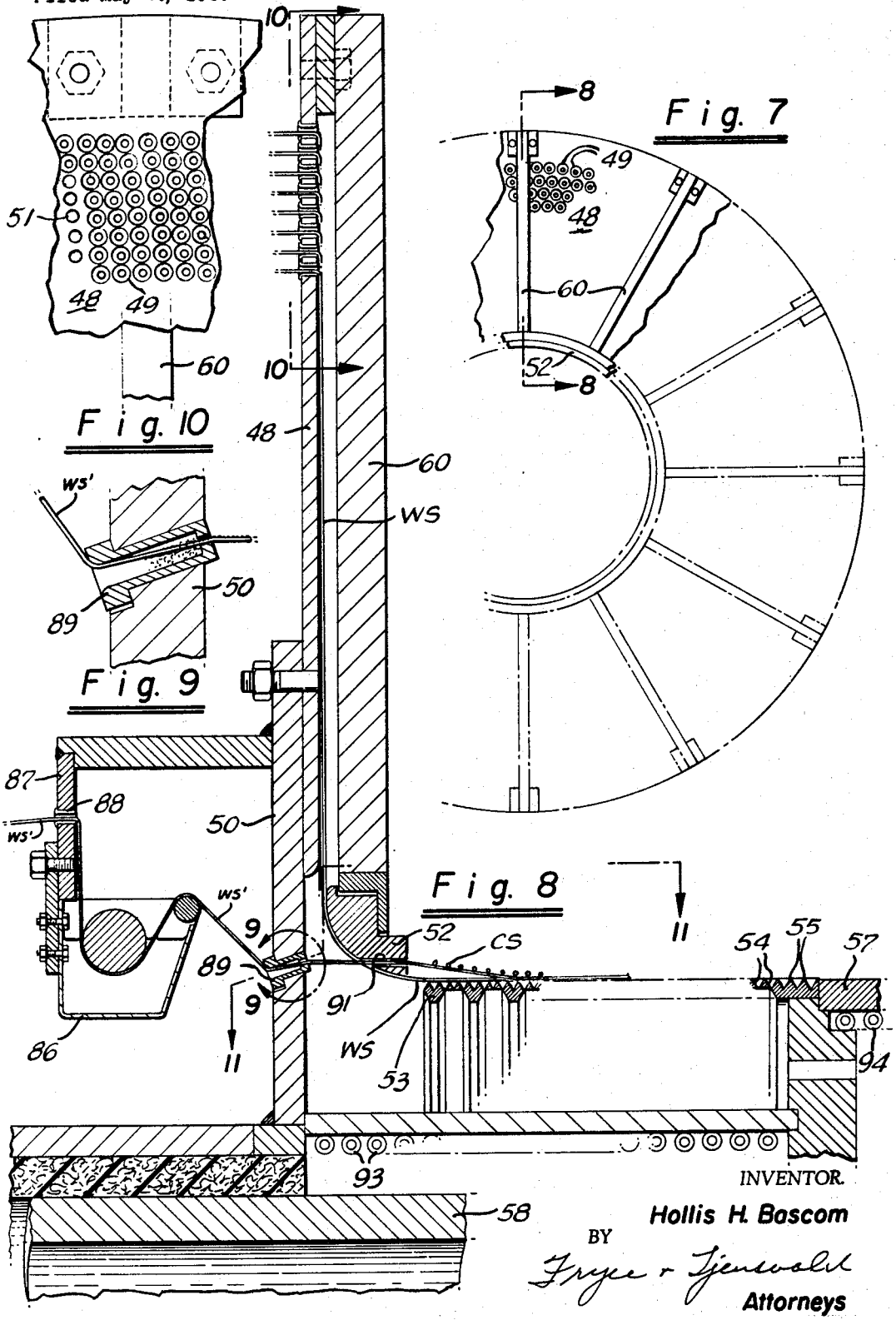

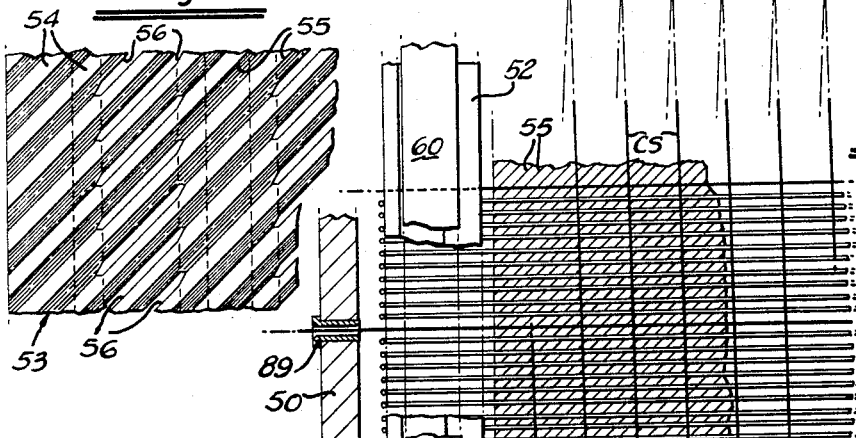
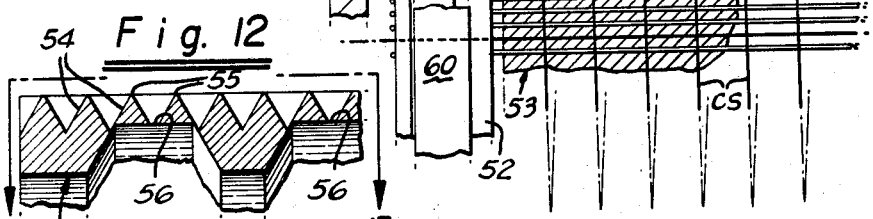
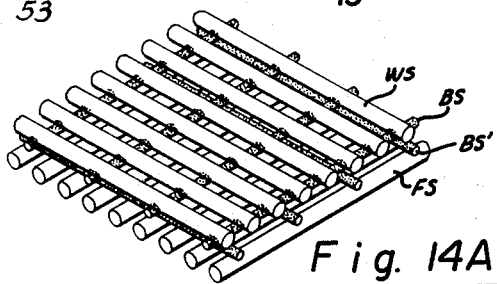
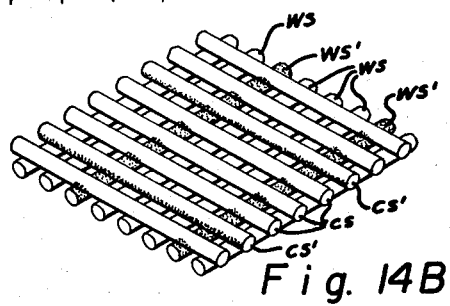
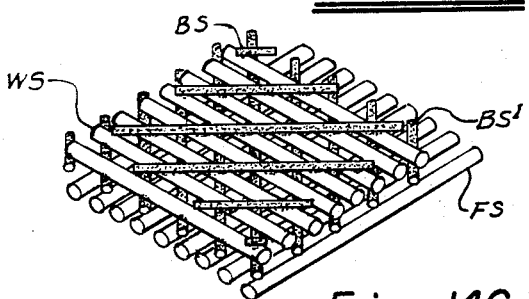
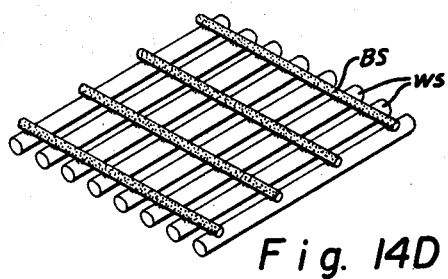
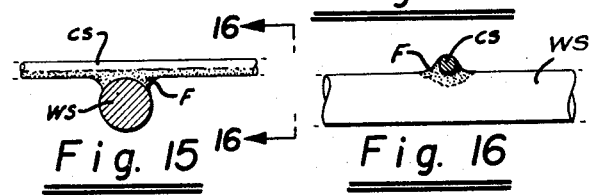

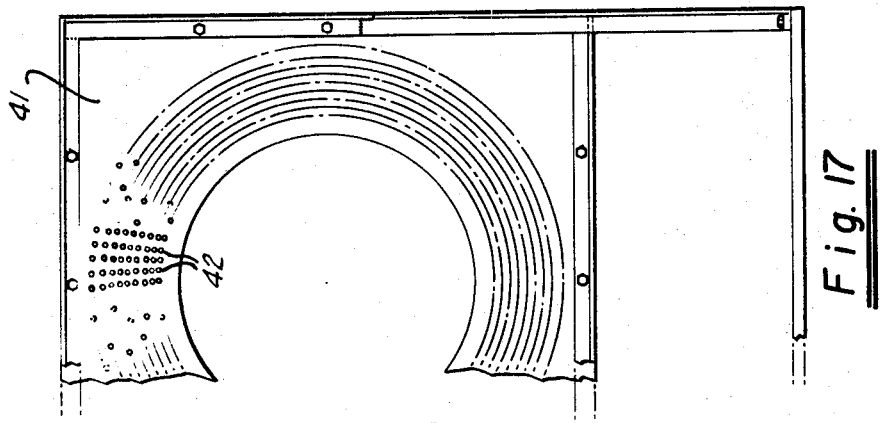
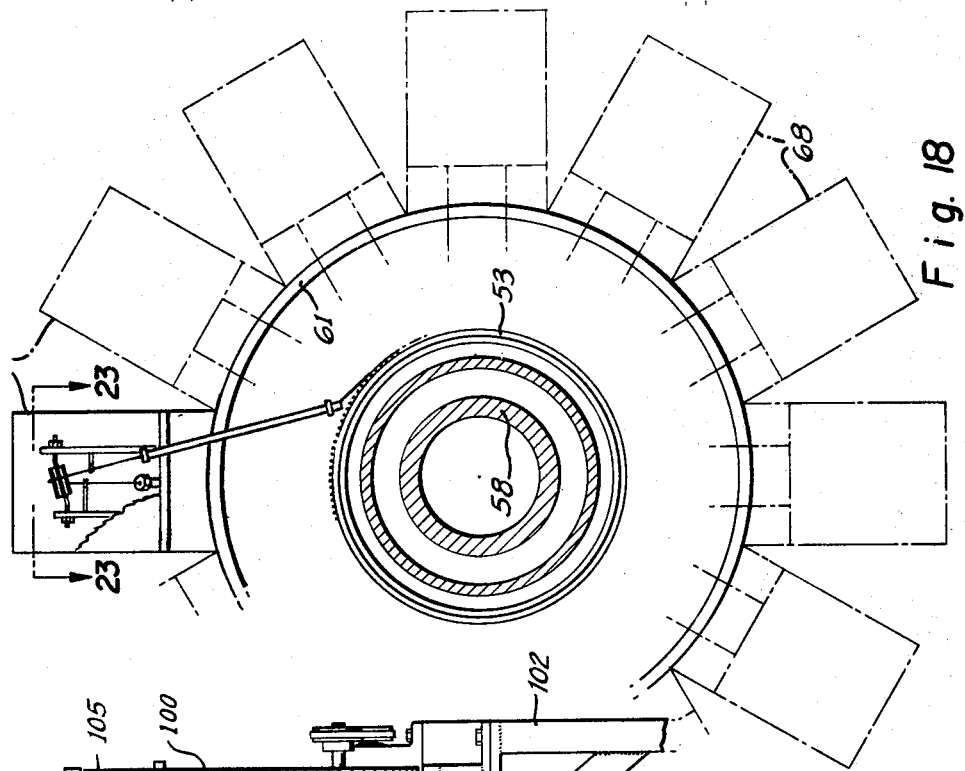
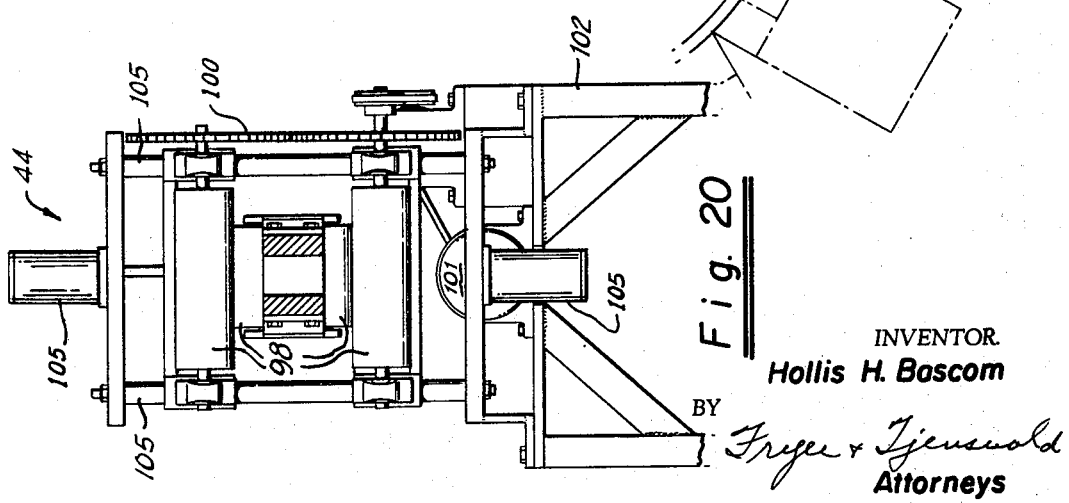
INVENTOR.
Hollis H. Bascom
BY Fryer & Tjensvold
Attorneys July 2, 1968 H. H. BASCOM 3,391,043
METHOD AND APPARATUS FOR MAKING NON-WOVEN FABRICS
Filed May 20, 1963 10 Sheets-Sheet 7

INVENTOR.
Hollis H. Bascom
BY
Attorneys

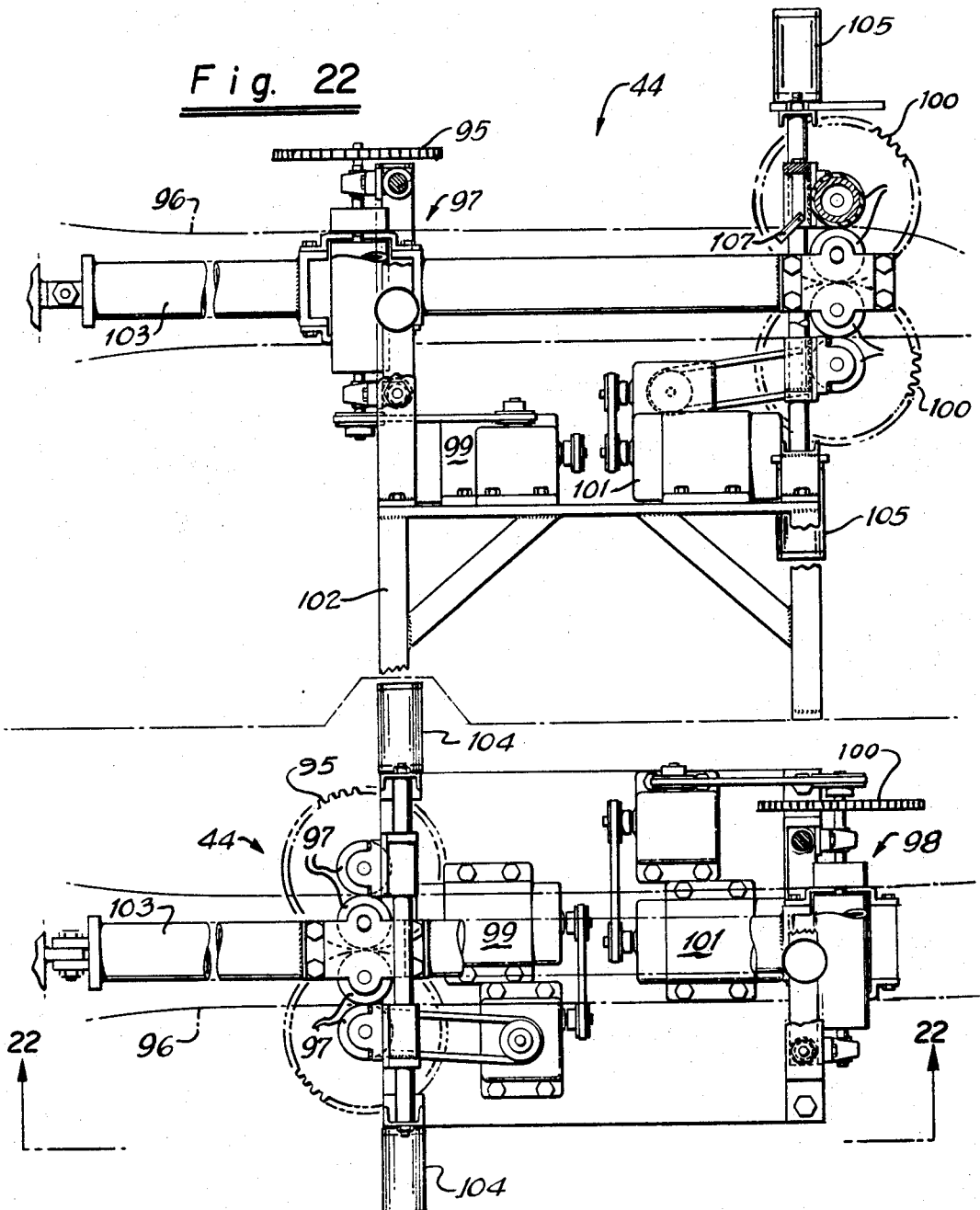

July 2, 1968  H. H. BASCOM  3,391,043
METHOD AND APPARATUS FOR MAKING NON-WOVEN FABRICS
Filed May 20, 1963  10 Sheets-Sheet 9

INVENTOR.
Hollis H. Bascom
BY
Fryer + Tjensvold
Attorneys

July 2, 1968 H. H. BASCOM 3,391,043
METHOD AND APPARATUS FOR MAKING NON-WOVEN FABRICS
Filed May 20, 1963 10 Sheets-Sheet 10
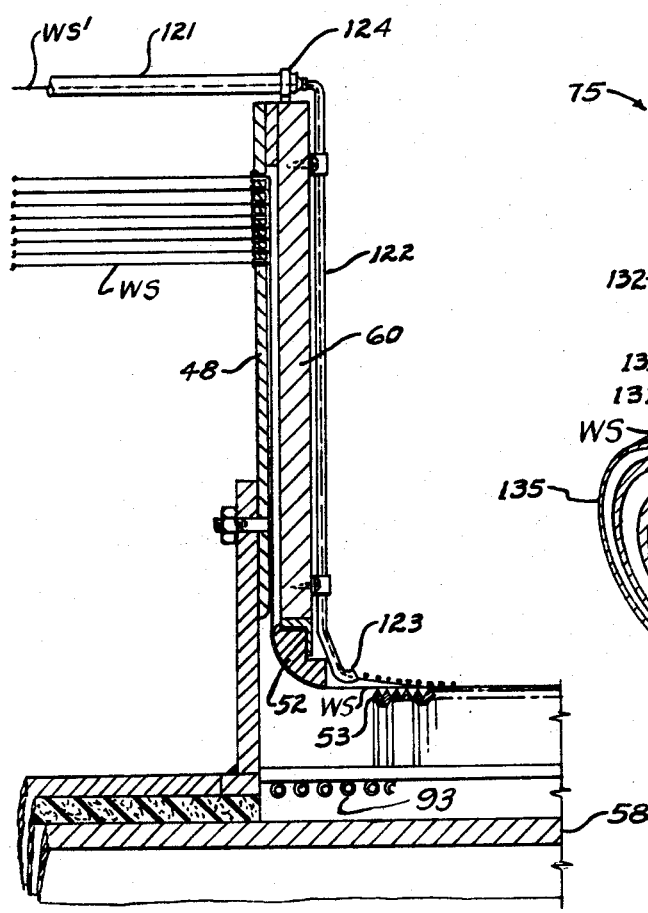
Fig. 29
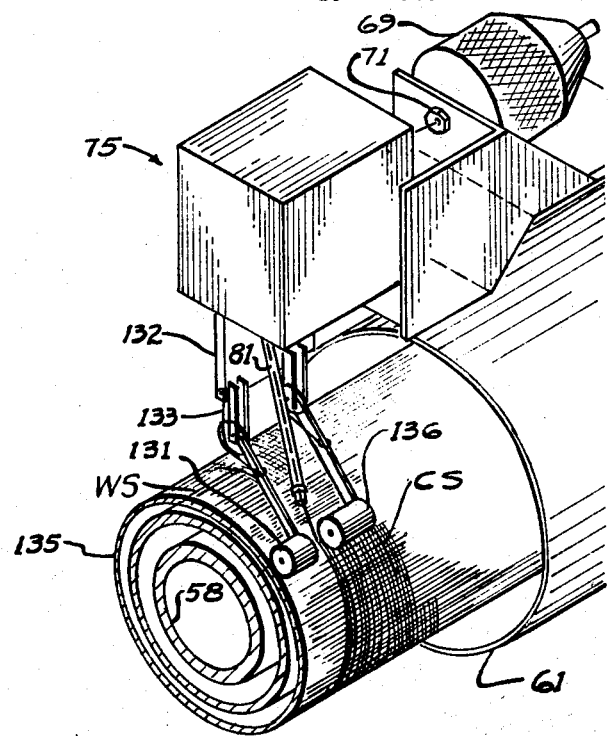
Fig. 30
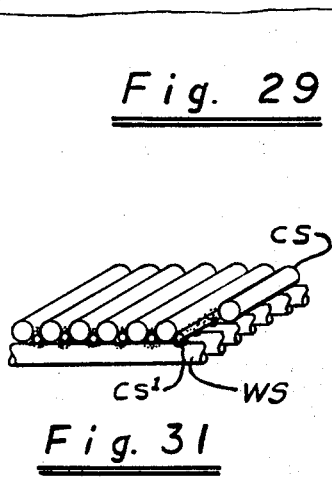
Fig. 31
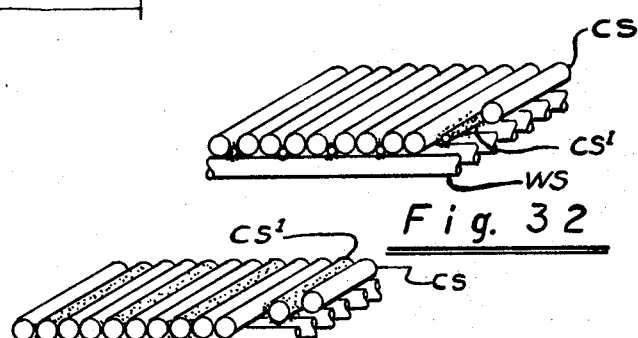
Fig. 32
Fig. 33
INVENTOR.
Hollis H. Bascom
BY
Fryer + Tjensvold
Attorneys

United States Patent Office 3,391,043
Patented July 2, 1968

3,391,043
METHOD AND APPARATUS FOR MAKING NON-WOVEN FABRICS
Hollis H. Bascom, Livermore, Calif., assignor to Orcon Corporation, Livermore, Calif., a corporation of California
Filed May 20, 1963, Ser. No. 281,421
20 Claims. (Cl. 156—181)

ABSTRACT OF THE DISCLOSURE

A magazine containing adhesive is rotated in an annular path around longitudinally moving warp strands. Centrifugal force keeps the adhesive in the outer part of the magazine. An individual cross strand is drawn through the adhesive while the magazine is rotated in the annular path and is then engaged with warp strands to bond the warp and cross strands together in a non-woven fabric. The amount and location of the adhesive on each cross strand is precisely regulated and the location and tension of each warp and cross strand is individually controlled to produce a fabric having precisely spaced strands and uniform strength bonds with a minimum of adhesive.

---

This invention relates to non-woven fabrics and particularly relates to techniques and apparatus for obtaining precise strand positioning with low adhesive content in the completed fabric.

Processes and apparatus for producing non-woven fabrics, fabrics not produced on weaving or knitting equipment, date back more than sixty years. During this time many non-woven fabric processes have been tried in attempts to duplicate woven fabric qualities at substantially lower cost.

Non-woven fabrics produced by conventional processes have contained a minimum of 10% adhesive by weight and usually contain 30% and in some cases as high as 50% adhesive by weight. This high adhesive content seriously impairs the woven fabric qualities of such non-woven fabrics. The non-woven fabrics produced by conventional processes thus lack the hand, drape, softness, absorbency and permeability of the fiber or fibers employed and instead exhibit must of the adhesive characteristics. Also, when high quantities of adhesive are required, the selection of adhesives which can be used is restricted to those which are low in cost. Even when lowest cost adhesives are used, the large amount required makes the minimum cost of the non-woven fabrics unnecessarily high.

High adhesive content is undesirable for another reason. Adhesives are often incompatible with materials, such as rubber and plastics, which are to be reinforced with the fabric. Thus, a high percentage of adhesive in the fabric can make it difficult to bond the fabric to the plastic or rubber being reinforced.

A continuous strand non-woven fabric should have a definite advantage over a woven fabric by virtue of better utilization of strand strength. Thus, woven fabrics are necessarily longitudinally crimped and laterally displaced by the weaving process. However, the prior art non-woven fabrics have lacked the controlled fiber placement required to realize such an advantage.

A primary object of the present invention is to make a precise assembly of strands with woven fabric handling characteristics and properties and at low cost. It is a related object to form strong cross strand bonds with a minimum of adhesive which is restricted substantially to the immediate area of the bond. In accordance with the present invention a non-woven fabric can be produced having an adhesive content less than ½ of 1% of the fabric by weight.

In the present invention a group of warp strands are assembled in a desired disposition and overlaid with a group of cross or fill strands after adhesive has been applied to one or both sets of strands. Heat and pressure applied for a period of time cause the two layers of fibers to adhere to one another.

The wrap strands, under a controlled tension, are stabilized laterally and vertically by a pair of radially spaced, reversely curved arcs effective to turn the warp strands through two steep angles. In a preferred mode, each angle may be about 90°. As a result, the warp strands passing through the two arcs are stably retained in the lowermost portions of the curves and are precisely positioned at the outlet of the second arc.

Cross or fill strands are engaged with the warp strands at the outlet of the second arc under a controlled pressure. Both strands are supported on a series of closely spaced upstanding edges which aid scavenging of adhesive. The edges are inclined at an angle to both the warp and fill strands to facilitate movement of the strands over the edges and to produce scavenging of adhesive by movement of the adhesive down the groove until it is picked up in the fabric. The edges are spaced to give adequate line support to the strands.

The cross strands are fed from rotating magazines which contain reservoirs for the adhesive. The cross strand, before being laid on the warp strand, has a closely controlled amount of adhesive applied on the side immediately adjacent the warp strands, and substantially all adhesive is removed from the other areas of the cross strand. Adhesive can also be applied to selected warp strands in closely controlled quantities on the sides facing the cross strands to thereby produce a bi-directional fabric having equal strength in both directions.

A roller can be mounted for rotation with the rotating magazines to minimize the effect of strand breakage and drop out by a slight lateral repositioning of adjacent strands. A roller can also be used to flatten and smooth the yarn at the time of bonding the cross strands to the warp strands.

The temperature is controlled both at the time of contact of the warp and cross strands and during the time that the adhesive is setting after such initial contact.

The foregoing mode of operation and apparatus effective to function to produce the results described constitute further specific objects of the present invention.

Fabrics produced in accordance with the present invention, as noted above, exhibit precise strand positioning and strong adhesive bonds between strands. Because little adhesive is needed cost is not critical, and a wide range of adhesives can be used. Thus, a particular adhesive can be selected to avoid problems of incompatibility between different materials. For this reason it is possible to bond together such different materials as steel, rubber, mineral, plastics and natural fibers. Unique products having high strength and selected physical and electrical or magnetic properties can be produced and are economically feasible. Such new products constitute still further objects of the present invention.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is an end elevation view of a tension cart and creel cart and is taken along the line and in the direction indicated by the arrows 2—2 in FIG. 1;

FIG. 3 is a side elevation view of the creel cart and is taken along the line and in the direction indicated by the arrows 3—3 in FIG. 2;

FIG. 4 is a fragmentary side elevation view of the lower part of the tension cart and is taken along the line and in the direction indicated by the arrows 4—4 in FIG. 2;

FIG. 5 is a fragmentary plan view of a tension disk assembly on the tension cart and is taken along the line and in the direction indicated by arrows 5—5 in FIG. 4;

FIG. 6 is an enlarged side elevation view, partially broken away and shown in section to show details of construction, of the strand bonding portion of the apparatus shown in FIG. 1;

FIG. 7 is a fragmentary enlarged view of the rear face of the strand positioning plate and is taken along the line and in the direction indicated by arrows 7—7 in FIG. 6;

FIG. 8 is a fragmentary enlarged view in section of the portion of the apparatus encircled by the arrows 8—8 in FIG. 6 and is taken in the direction indicated by the arrows 8—8 in FIG. 7;

FIG. 9 is an enlarged view in section of the portion of apparatus shown encircled by the arrows 9—9 in FIG. 8 and shows an adhesive metering and positioning die for warp strands;

FIG. 10 is a fragmentary view of the front face of a strand positioning plate and is taken along the line and in the direction indicated by the arrows 10—10 in FIG. 8;

FIG. 11 is a fragmentary plan view taken along the line and in the direction indicated by the arrows 11—11 in FIG. 8;

FIG. 12 is an enlarged view in section of the part of strand juncture stabilization mechanism shown encircled by the arrows 12—12 in FIG. 8;

FIG. 13 is a fragmentary plan view taken along the line and in the direction indicated by the arrows 13—13 in FIG. 12;

FIGS. 14A through 14D are isometric views of four different products constructed in accordance with the present invention;

FIG. 15 is an enlarged view showing details of the type of bond existing between intersecting strands in the products shown in FIGS. 14A through 14D;

FIG. 16 is a view taken along the line and in the direction indicated by the arrows 16—16 in FIG. 15;

FIG. 17 is an elevation view of an eyeboard and is taken along the line and in the direction indicated by the arrows 17—17 in FIG. 1;

FIG. 18 is an elevation view taken along the line and in the direction indicated by the arrows 18—18 in FIG. 6 and shows the manner of feeding cross or fill strands from magazines which are rotated about the warp strands;

FIG. 20 is an elevation view of drive mechanism for moving the non-woven fabric to a storage roll;

FIG. 21 is a plan view of the drive mechanism shown in FIG. 20;

FIG. 22 is a side elevation view of the drive mechanism taken along the line and in the direction indicated by the arrows 22—22 in FIG. 21;

FIG. 29 is a fragmentary elevation view like FIG. 8 showing another form of apparatus for applying adhesive to the warp strands;

FIG. 30 is a perspective view of a modification using spring biased rollers for positioning warp and cross strands; and FIGS. 31 through 33 are isometric views of products produced by the apparatus shown in FIGS. 27 and 28.

Figure 1:
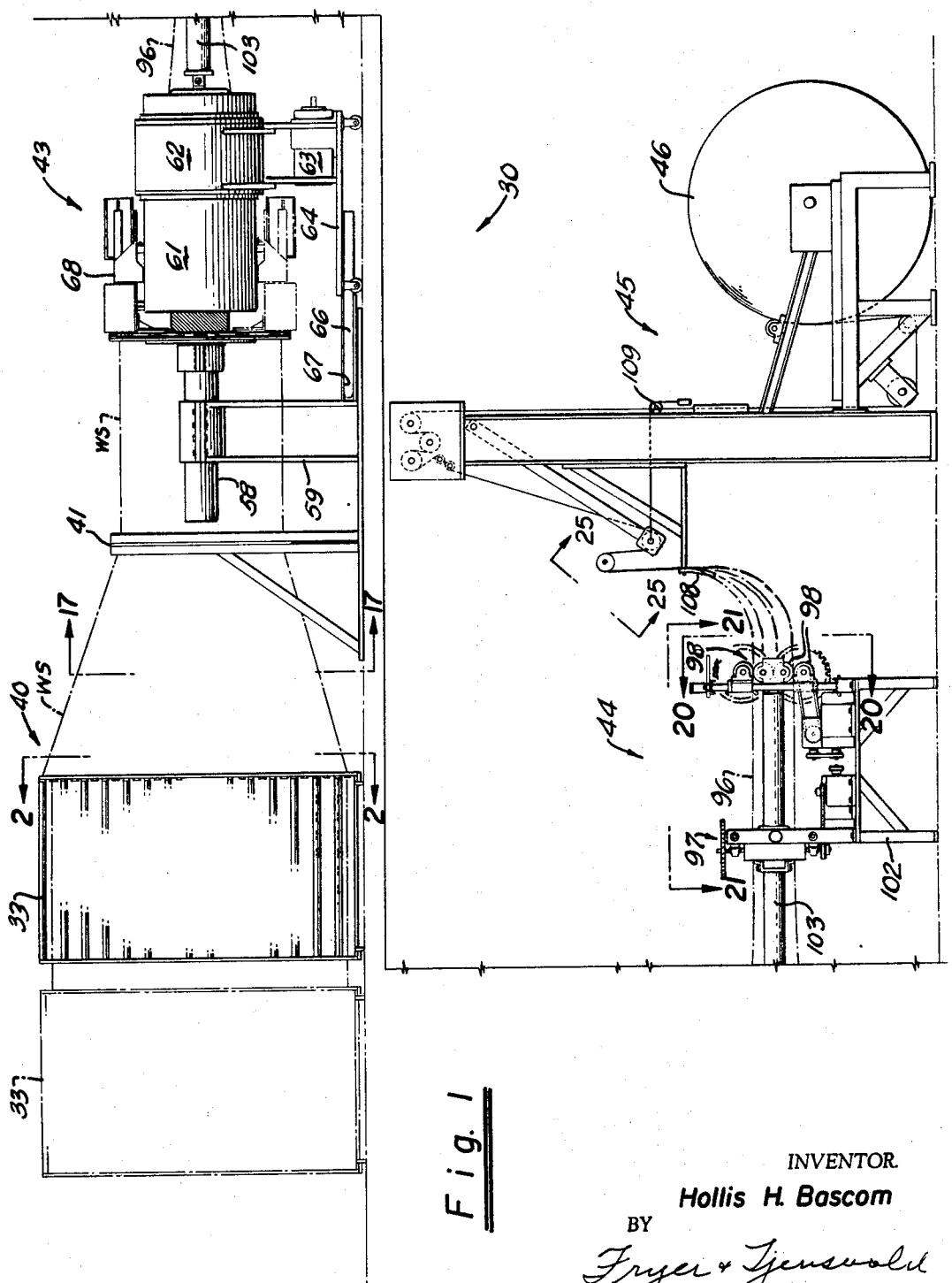
FIG. 1 is a side elevation view of apparatus for forming non-woven fabric constructed in accordance with one embodiment of the present invention.

In FIG. 1, apparatus for forming non-woven fabrics constructed in accordance with one embodiment of the present invention is indicated generally by the reference numeral 30. Beginning at the lefthand end of the drawing, the apparatus includes means 40 affording a supply of warp strands under a controlled tension and incorporates one or more sets of creel carts 32 (see FIG. 2) and tension carts 33. Each creel cart 32 is disposed inwardly, as viewed in FIG. 1, and between right and lefthand tension carts 33. Warp strands WS are led off one bank of thread packages 34 in one direction through apertures 36 of a tension cart to means, such as tension disks 37, for imposing a controlled tension on each warp strand WS. From the tension disks 37, the warp strands WS are conducted through individual eyelets 38 in eyelet bars 39 of the tension carts of an eyeboard 41 (see also FIG. 17) where the warp strands are conducted through individual eyelets or porcelains 42 and arranged in a circular pattern.

As indicated by the phantom outlines in FIG. 1, as many sets of creel carts and tension carts may be used as are necessary to provide the warp strand thread count desired in the completed fabric. If several sets of carts are used, the warp strands from the farthest tension cart are conducted sequentially through the tension carts nearer the eyeboard 41. The eyelet bars 39 are therefore formed with more eyelets 38 than are needed to accommodate the warp strands from a companion creel cart 32.

From the outlet side of the eyeboard 41, the warp strands are conducted to a strand positioning and bonding mechanism indicated generally by the reference numeral 43 in FIG. 1, and described in greater detail below, in which the warp strands are adhesively bonded to cross strands overlaid at an angle to the warp strands. The fabric emerges from the mechanism 43 in tube form 96. Drive mechanism indicated generally by the reference numeral 44 in FIG. 1 frictionally engages the tube of fabric to continuously pull the tube longitudinally through the apparatus 30. As shown in the embodiment of the apparatus 30 illustrated in FIG. 1, the tube of fabric may be slit along its upper side and opened in a relaxed form to a flat sheet at the outlet of the drive mechanism 44 and subsequently wound by a winding mechanism 45 on a storage roll 46.

In accordance with the present invention the warp strands WS disposed in a circular pattern at the outlet of eyeboard 41 are passed through means which include a pair of reversely curved and radially spaced arcs for stabilizing the lateral and vertical position of each individual warp strand. These means include a strand positioning plate 48 mounted on a support disk 50. The plate 48 has individual eyelets or porcelains 49 mounted in circumferentially and radially spaced openings 51 drilled in the plate 48. The internal diameter of each eyelet 49 is several times that of the warp strand passed therethrough to prevent fraying of the warp strand and also to permit the warp strands to seek their own position in the lowermost part of the circular openings thus afforded. As will become more apparent from the description which follows, the accuracy with which these openings are laid out determines the accuracy of the spacing of the warp strands in the final product.

The warp strands WS then flow down the rear face of the plate 48 in a converging pattern until they contact a ring 52 maintained in position by a series of radial struts 60 attached to the plate 48. The ring 52 affords the second, concave arc for stabilizing the warp strands WS. The ring 52 encircles the converging group of warp strands and the concave curvature of its innermost diameter is thus reversely curved with respect to the curvature of the bottoms of the circular openings in the eyelets 49. As best shown in FIG. 8, the ring 52 incorporates a convex curvature in cross-section to provide a surface of steadily decreasing diameters for the incoming warp strands WS. The only stable position for the warp strands WS is thus on the portions of the reversely curved concave arcs which are radially closest to one another, that is, the bottoms of the respective concave arcs. All forces are tending to keep warp strands in these parts of the arcs. On any displacement of the strands from this stabilized position return forces are immediately set up. As a result, the warp strands WS leaving the outlet of the ring 52 are continuously maintained in precise lateral and radial positions.

Strand junction stabilization means which include a first cylindrically shaped tube or cage 53 having a series of closely spaced grooves 54 affording upstanding edges 55 are positioned at the outlet of the ring 52. As best shown in FIGS. 12 and 13 the edges 55 are inclined to the direction of movement of the warp strands WS at a helix angle. The purpose of this inclination is twofold. It provides line support for cores strands overlaying the warp strands, in a manner to be described, while permitting smooth transfer of the line support to the warp and cross strands as these strands move along the surface of the tube 53. It also permits the fabric to provide a self scavenging action by picking up any adhesive which drops into the grooves. Thus, the strands push such adhesive along the groove until it is picked up and blended into the fabric. For this latter function to be effective it is desirable to keep the angle between the warp strands and edges as small as possible, and yet prevent the warp strands from dropping off the edges into the grooves. While a high angle is illustrated, in most cases a small angle, in the order of 5° to 10°, is more desirable. Openings 56 may be formed in the side walls of the tube 53 and regularly spaced circumferentially and longitudinally of the tube to permit scaveging of excess adhesive into the center of the tube. Although a knurled tube is illustrated, a wire cage would work equally well. It is desirable that the stabilizing means be Teflon coated.

A second tube 57 is included in the means for stabilizing the junctures of the strands for the period of time when the adhesive is setting up and during which it is necessary to maintain the relative positions of the two sets of strands. The tube 57 however has a smooth outer surface since scavenging of adhesive is not a problem by the time the strands reach the tube 57. The outside diameter of the tube 57 may be slightly less than that of the tube or cage 53 to reduce friction between the fabric and the tube 57.

As best shown in FIG. 6, both the tubes 57 and 53, as well as the strand positioning plate 48 and ring 52 are supported on a tube 58, which is in turn clamped in position on a stand 59.

With continued reference to FIG. 6 it will be seen that the mechanism 43 for bonding the two layers of strands includes a tube 61 which encircles the tube 57 and which is mounted for rotation within a support ring 62. The tube 61 is rotated by a motor 63, and the entire mechanism is mounted on a wheeled dolly 64 which is fitted with a pair of guides 66 adapted to be slidably received in complementary channels 67 attached to the stand 59. Thus, the tube 61 can be readily positioned axially along the tube 57 while being accurately maintained concentric with the tube.

Figure 23:
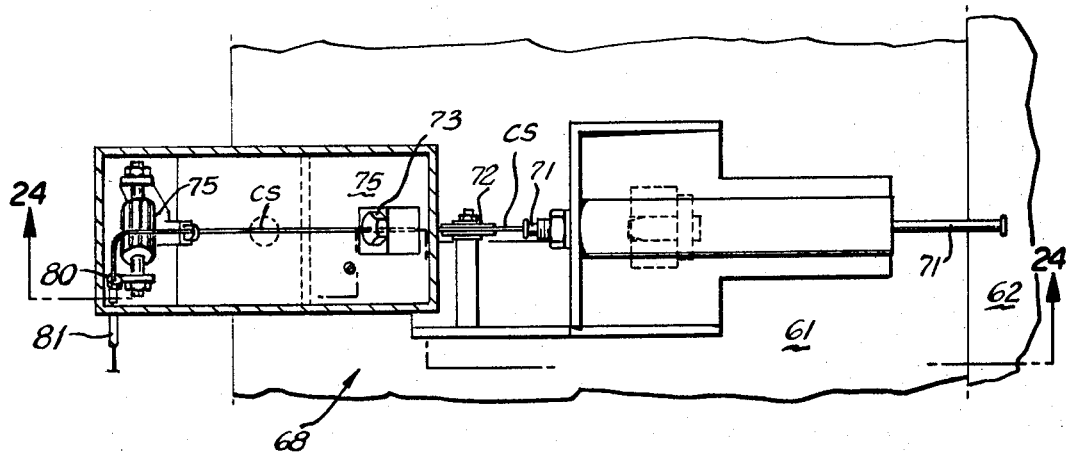
FIG. 23 is a plan view of a magazine for a cross strand thread package.
Figure 24:
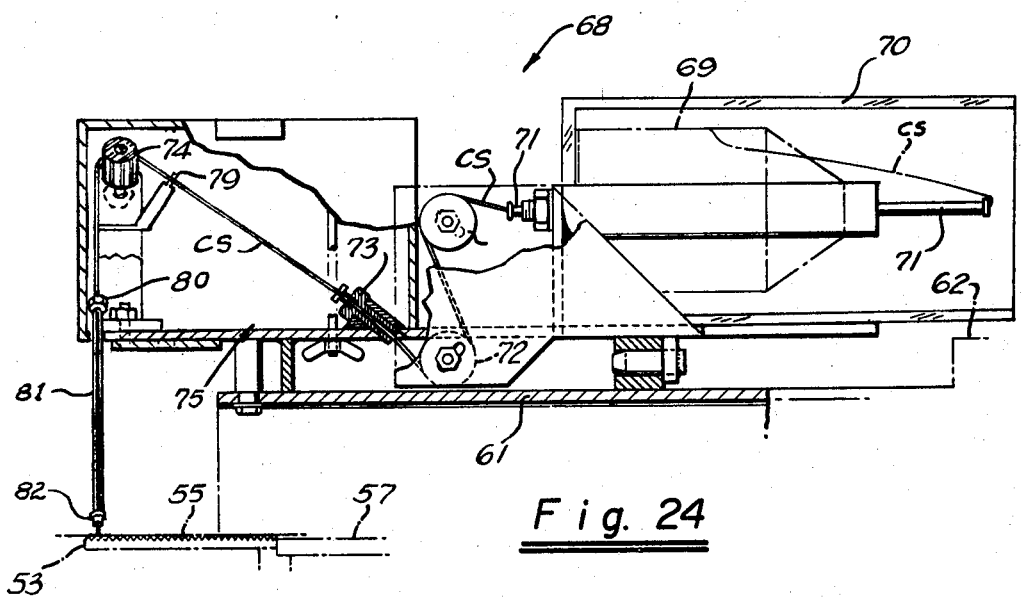
FIG. 24 is an elevation view of the magazine shown in FIG. 23.

One or more magazines 68 (see also FIGS. 18, 23 and 24) are mounted on the outer surface of the tube 61. Each magazine includes a strand package 69 from which a fill or cross strand CS is taken off and conducted down through a tube 71 to a pair of tension disks 72 which impose a controlled tension on the cross strand CS. The strand packages may have Lucite guards 70 for preventing ballooning of the strand. From the tension disk 72 the cross strand CS is led through a die 73 and into a container 75 forming a reservoir for adhesive. The die 73 is positioned radially inwardly of the adhesive in the reservoir 75 so that the centrifugal head imposed on the adhesive during rotation of the magazine 68 is sufficient to keep the adhesive away from the inlet opening of the die. The die 73 may preferably be approximately six to eight times the diameter of cross strand CS to prevent the build up of fiber particles or sizing which could cause strand breakage. The die is also long enough to prevent adhesive from coming to the exterior surface of the die during those periods when the magazine is not being rotated. Since the fluid pressure at this time amounts only to a few inches of fluid, the die does not need to be excessively long.

In the event water thin adhesives are necessary for application of fragile yarns handled at high speeds, it may be desirable to position both the die 73 and a metering die 80, at the inlet end of an exit tube 76, substantially on the line which is at the liquid center of the adhesive chamber and which extends parallel to the axis of the support 53. If the adhesive chamber is never filled to more than 50% capacity, the die 73 and metering die 80 will never be subjected to a liquid head, even when the magazine is stationary.

After passing through the adhesive the direction of movement is turned by passing the cross strand over a knurled roller 74. Pin guides 79 may be disposed in slightly longitudinally spaced pairs to engage opposite side edges of the cross strand CS at both the inlet and outlet of the knurled roller 74. The roller 74 is mounted for rotation on needle points at the opposite ends of the roller to minimize the bearing surface exposed to the adhesive. It is essential that the roller turn so that the yarn does not slide over it. Any sliding of the yarn at this point will produce fraying and fuzzing of the yarn. It is for this reason that a knurled surface is used rather than a smooth surface, which might otherwise be thought to be desirable. The die 80 is also a large diameter die which is preferably four to seven times the diameter of the yarn to prevent build up of yarn particles which could lead to strand breakage at this point. The die 80 serves as a metering means for controlling the amount of adhesive on the cross strand CS.

The exit tube 81 is a large diameter tube which insures that there will be no adhesive to tube contact, or resulting high viscous drag, during passage of the cross strand to the tube. A forming die 82 is mounted on the lower end of the tube and serves to shape the adhesive onto the bottom side of the yarn.

Figure 19:
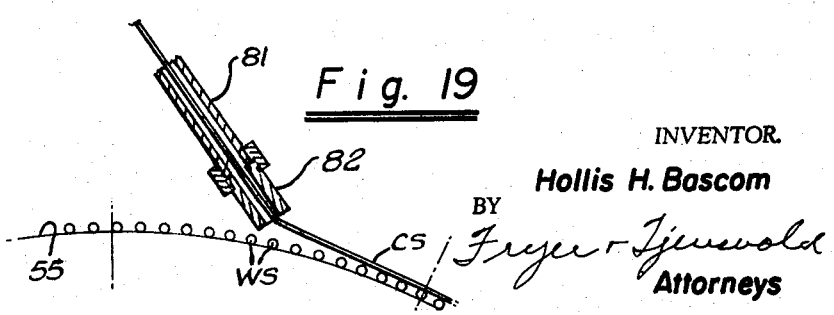
FIG. 19 is an enlarged view of the adhesive positioning apparatus shown in FIG. 18.

As best illustrated in FIG. 19 the axis of the tube 81 and the forming die 82 are set at an angle to a line connecting the center of the die and the point of contact of the cross strand CS with the warp strands on the cage 53. The cross strand CS is thus depressed below the tangent to wipe adhesive from the upper side of the cross strand. The metering die 82 is also preferably located near enough to the warp strands to prevent any twisting of the cross strands CS between the outlet of the die and the point of engagement with the warp strands.

As the magazines 68 are rotated about the warp strands WS each cross strand CS from each magazine is pressed into engagement with the warp strands as the cross strands CS trace a helical path about the continuously moving warp strands. In FIG. 11 the helical trace of a single cross strand CS is shown for a number of successive turns of a single magazine about the bundle of warp strands. The cross strand density is dependent upon the number of magazines 68 and the relative speed of warp and cross strands.

As well illustrated in FIG. 11, the inclination of the edges 55 affords line support for both the warp strands WS and the cross strands CS. The spacing and inclination of these edges are important aspects of the present invention. The spacing between the edges 55 is related to the stiffness and the tensions of the warp strands and cross strands to prevent deflection of the strands below a surface corresponding to an envelope of the outermost points of the edges. This spacing will vary with the materials and the thread count of the fabric being made. The tube or cage 53 is therefore preferably removably mounted on the tube 58, see FIG. 6, so that any one of a number of interchangeable tubes having edge spacing suited for different fabrics can be used.

The grooved surface of the tube 53 permits continuous scavenging of excess adhesive along the initial part of the tube periphery. Thus, the moving warp strands WS scavenge excess adhesive from within the grooves and there is no build up of adhesive on the outermost periphery of the tube because of the small area afforded by hte edges 55. Therefore, in contrast to a smooth surfaced conventional mandrel, there is no adhesive build up tending to break bonds at the point of formation.

Since problems of adhesive build up on the surface of the supports are critical only in the immediate area of application of adhesive the spaced edge type support afforded by the tube 53 need be used only in the initial part of the overall support. The overall support including the tube 57 must, however, be long enough in relation to the number of cross strands used and bonds developed to insure that uneven strains involved in the tubular web leaving the support are not reflected in the web at the point of formation. A minimum length of eight diameters is normally sufficient.

As discussed above, only that adhesive is used which is needed to develop a strong filleted bond between the warp and cross strands, and this is illustrated in FIGS. 15 and 16. In FIGS. 15 and 16 the warp strand WS is of somewhat larger diameter than the cross strand CS. However, and as will be described in further detail below, same size strands may be used in those instances where it is desired to develop a bi-directional fabric having a minimum of bonds but very high adhesion between layers.

Because the warp strands and cross strands are pressed into intimate contact with one another, the joint formed is a rectangle having an area at least as great as the product of the diameters of the warp and cross strands. Thus, the strands overlap at substantially right angles to form the most concentrated area of juncture. There is no spacing between the strands, other than a very fine thickness of adhesive in the order of 0.005 inch, or less, since the closely spaced edges 55 of the tube 53 prevent any deflection of the strands on the support.

The manner in which the positioning tip 82 of the rotating magazine orients the adhesive on the cross strand CS causes the adhesive on the lower face of the cross strand CS to cushion the initial contact with the warp strand WS and also causes a heavy fillet F to be formed on all four sides of the joint.

The structure described so far is effective to apply adhesive to the cross strands to form the bonds with the warp strands. In some instances, particularly in the case of bi-directional fabrics, it may be desirable to apply adhesive to less than all of the cross strands and to bond those cross strands not having adhesive with the warp strands by applying adhesive to certain ones of the warp strands. One form of apparatus constructed in accordance with the present invention for achieving this result is shown in FIG. 8.

In this instance a tray 86 is supported from the support disk 50 by a depending bracket 87. Although not illustrated, a similar tray can be mounted on the lower side of the tube 58. The tray 86 forms a reservoir for adhesive, and a warp strand WS' is led into the adhesive in the tray after being conducted through a porcelain or eyelet 88. From the tray the warp strand WS' is conducted to a die 89 which performs a combined adhesive metering and positioning function like that performed by the two dies 80 and 82 of the rotating magazine 68. However, the die 89 wipes the adhesive from the radially inner face of the warp strand WS' and leaves the desired thickness of adhesive on the face disposed toward the cross strands CS. Each warp strand WS' is then preferably conducted through a passageway 91 formed in the ring 52 to lead the wet warp strands WS' into the tubular fabric being formed at a radial spacing slightly greater than that of the dry warp strands WS. Doing this insures that the dry cross strands CS adhere well to the wet warp strand WS'. This manner of feeding in the wet warp strands WS' is particularly important if the wet warp strands WS' have a smaller diameter than the dry warp strands WS.

Another form of apparatus for applying adhesive to selected ones of the warp strands WS' is illustrated in FIG. 29. In this instance adhesive containers in the form of tubes 121 are mounted on the outer end of the spider 60. The adhesive in a tube 121 is applied to the warp strand WS' as it moves longitudinally through the tube. A second tube 122 extends radially inwardly from the exit end of the tube 121 and terminates closely adjacent the dry warp strands WS leaving the ring 52. The inner end of the tube 122 is tilted upwardly a slight amount as indicated by the reference numeral 123. The wet warp strands WS' leaving the tube 122 engage the upturned end on the radially inner sides of the warp strands WS' so that the adhesive is positioned on the outer surface of the warp strands WS' for the same purpose as described above with respect to the apparatus shown in FIG. 8. The advantage of the apparatus shown in FIG. 29 is ready removal or installation of the tubes for applying adhesive to the warp strands WS'. Thus, the tube 122 is mounted in position by the screw retained clips illustrated, and the tube 121 can be snapped into or out of place by means of flexible clips 124. Very little time is needed to change over from an all dry warp strand set-up to that shown in FIG. 29.

In accordance with the present invention the two parts of the support, tube 53 and tube 57, may be separately and selectively heated or cooled to different temperatures by heating or cooling coils 93 and 94.

When running some yarns, such as asbestos, in a tight warp fabric, warp strands occasionally break out and leave a vacant streak. This can be corrected by applying the cross strand several inches from the strand positioning ring and running a spring loaded roller over the warp strands just ahead of the place where the wet across strands are applied. This has the effect of flattening out the yarn and slightly shifting the warp strands laterally to fill any gap which would otherwise be produced by breakage of a warp strand. The roller may also be used in conjunction with a support ring as an additional stabilizing means to fix the position of the warp strands at the point of engagement by the cross strand. This is particularly useful in running thin warp strands to which only a limited amount of tension can be applied for arc stabilization.

Figure 26:
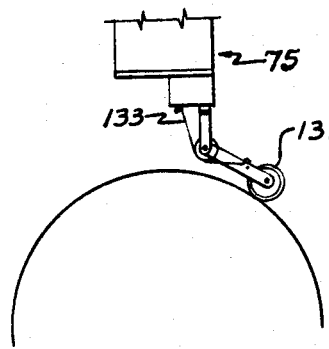
FIG. 26 is a fragmentary elevation view of a strand positioning roller.

One form of apparatus for functioning in this manner is illustrated in FIG. 30. In this case a warp strand positioning roller 131 is mounted on a depending plate 132 which in turn is attached to the container 75. The roller 131 is mounted on a lever arm which is pivotally connected to a pair of depending lugs attached to the plate 132. A spring 133 biases the roller toward engagement with the warp strands WS as the strands pass over a support ring 135 mounted in front of the cage 53. See also FIG. 26. The roller 131 is disposed alongside the die 82 and thus serves to prevent lateral displacement of the warp strand by the cross strand. One roller may be used for each cross strand magazine.

As illustrated in FIG. 30 a second roller 136 may also be used to flatten and smooth the yarn much the same as calendering would. This roller also serves to further compact the material and produce a higher density. This roller is mounted on the plate 132 in the same manner as the roller 131 and is spring biased like roller 131. The roller 136 engages the yarn at a point where the adhesive applied by the cross strands CS is not yet tacky. The roller 136 further assures that the warp and cross strands will be in one circular surface and will not be stacked.

The fabric leaves the mechanism 43 in a tube form as indicated by the numeral 96 in FIGS. 1, 21 and 22. The drive mechanism 44 illustrated in these figs. comprises two sets of friction drive rollers mounted on axes perpendicular to one another and driven by respective motors 99 and 101 by pulleys and V-belts as illustrated. The friction drive rollers are supported by a stand 102 and are aligned about a central tube 103 connected to the tube 57 of the bonding mechanism 43. The rollers 97 engage the insides and outsides of the side walls of the tube of fabric 96 while the rollers 98 engage the top and bottom of the tube. The necessary pressure between the rollers 97 and the rollers 98 is developed by air cylinders 104 and 105, respectively. It is necessary to have all parts of the tube drive at the same speed. If either the top, bottom or one side drives at a speed different from the other parts, there will be distortion which can result in reduction of the circumference of the tube so as to prevent the tube from slipping over the drive rollers. In the present invention, spur gears 95 are used to drive the two outside vertical rollers 97, and spur gears 100 are used to drive the two outside horizontal rollers 98. Preferably, the circumferential extent of the tube of fabric 96 engaged by the rollers 97 overlaps to some extent that engaged by the rollers 98 to even out any stresses imposed on the tube of fabric 96 by the drive mechanism 44.

In accordance with the present invention means are provided for opening the fabric in a relaxed form, and such means include a knife edge 107 disposed at an angle to slice the tube of fabric 96 along the top just before it enters the drive rollers 98.

Figure 25:
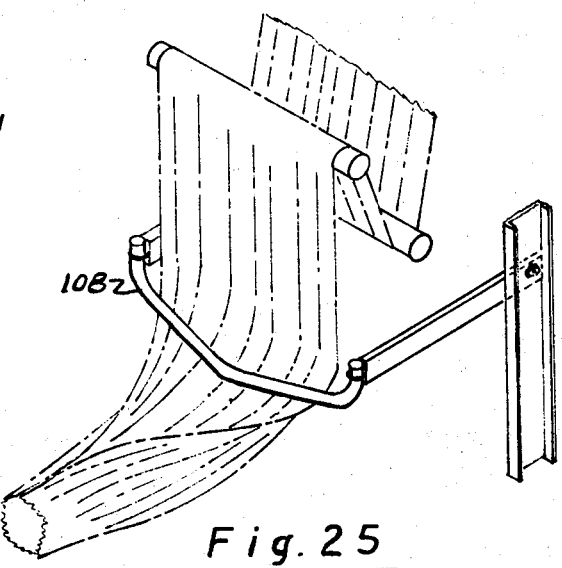
FIG. 25 is a perspective view of a fabric flattening bar and is taken generally in the direction of the arrows 25—25 in FIG. 1.

An expander bar 108, see FIGS. 1 and 25, then completes the opening of the tube to a flat sheet, and the sheet of fabric is wound on the storage roller 46 which is driven by a motor controlled by a rheostat 109 responsive to the tension in the fabric as indicated by a dancer roller 111.

In addition to the rheostat control of the storage roller 46 by the dancer roller 111, a cantilevered roller (not illustrated) may project rearwardly from the tube 103 to sense the drape of the tube 96 as it leaves the drive means, and by means of limit switches, stop and start the storage roller 46 to maintain the proper amount of drape in the tube.

The apparatus of the present invention enables several new products to be realized, and some of these products are illustrated in FIGS. 14A through 14D. In FIG. 14A a four layer product is shown which comprises two main layers of warp strands WS and fill strands FS disposed at an angle to one another and joined by two layers of binder strands BS and BS' which are adhesively coated and bonded to one another. The strands in the binder strand layers are widely spaced and of small diameter, and the strands of the two main layers are free of adhesive except for the junctions with the binder strands. As a result, the handling characteristics of the completed fabric is substantially independent of the adhesive so that the woven fabric exhibits hand and drape characteristics of a natural fiber, woven fabric. The fabric illustrated in FIG. 14A can be formed by joining under pressure and temperature two layers of a fabric like that shown in FIG. 14D, which is made directly by the process described above. In such case the residual adhesive on the binder strands BS and BS', which is set but not cured in the above described process, joins the binder strands and thus the two layers.

The fabric shown in FIG. 14C can also be formed by joining two layers of fabric like that illustrated in FIG. 14D. In this fabric the binder strands BS are disposed on the outer surface of the fabric rather than immediately adjacent the binder strands BS'. The two main layers of strands WS and FS are joined only by the intermediate layer of binder strands BS' disposed at an angle, exaggerated for illustration in FIG. 14C, to both the fill strands FS and the warp strands WS. Once again, the small diameter of the binder strands and the low amount of adhesive used in the completed fabric permits the fabric to exhibit the handling characteristics of the materials used rather than the adhesive employed.

A bi-directional fabric is illustrated in FIG. 14B in which certain ones (WS') only of the warp strands WS are joined to each of the cross strands CS and certain ones only (CS') of the cross strands (CS) are joined to each of the warp strands WS. Thus, as illustrated, the fabric has a low adhesive content but has high strength between the two main layers because each strand in one layer is bonded to the opposite layer by a series of spaced bonds and all of the bonds in both main layers must be broken for the two main layers to separate. This fabric can be produced by the modifications of the apparatus employing the tray 86 and die 89 illustrated in FIG. 8 or the tubes 121 and 122 shown in FIG. 29.

Additional new products are shown in FIGS. 31 through 33. These products are all produced by applying adhesive to selected cross strands only. In FIG. 31 every other cross strand CS' has adhesive with the alternate cross strand CS dry. The adhesive cross strands CS' are somewhat smaller than the dry cross strands CS and are disposed between the dry cross strands CS and the warp strands WS so as not to be visible in the completed fabric. A desirable feature of a process, described below, for producing this product is the pressure roll 136, described above in reference to FIG. 30, which rolls the dry cross strands into the wet cross strands and improves the adhesion of the wet cross strands to the warp strands.

The product illustrated in FIG. 32 is similar to that shown in FIG. 31 except that one wet cross strand CS' adheres two dry cross strands CS as well as each of the warp strands WS. The adhesive cross strands CS' are not visible in this product either.

In FIG. 33 a product is illustrated in which a single wet cross strand CS' adheres two dry cross strands CS as well as each of the warp strands WS. In this case the wet cross strands CS' are the same size as the dry cross strands CS.

Figure 27:
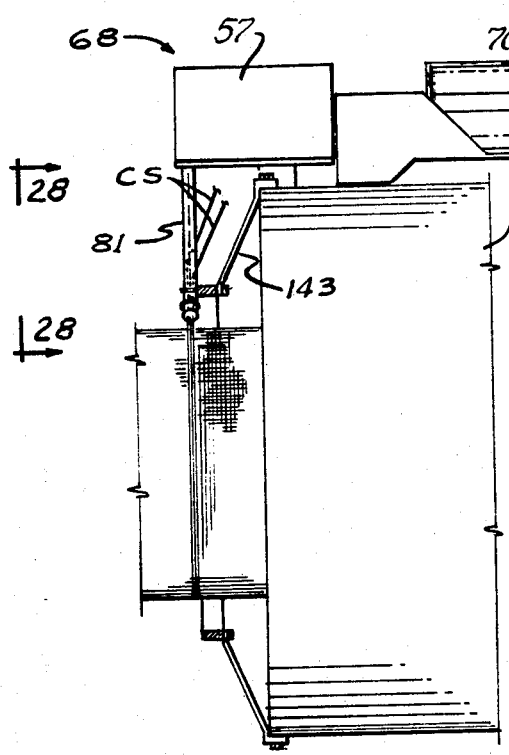
FIG. 27 is a fragmentary side elevation view of a modification for combining three cross strands prior to bonding to the warp strands.
Figure 28:
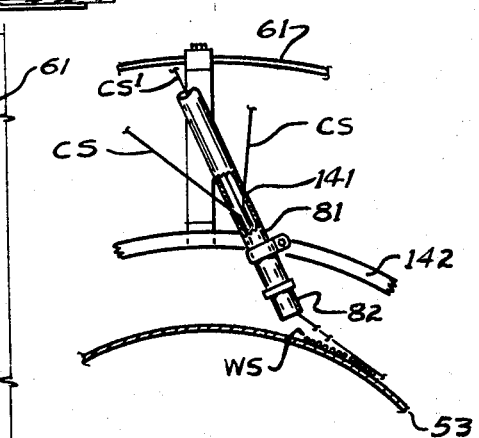
FIG. 28 is a fragmentary elevation view taken along the line and in the direction indicated by the arrows 28—28 in FIG. 27.

With reference now to FIGS. 27 and 28, there is illustrated a modified magazine exit tube construction which permits the products shown in FIGS. 31 through 33 to be readily and directly formed by the strand positioning and bonding mechanism 43. In this instance the tube 81 depending from the container 75 is modified so as to be formed with two side apertures 141 for the entrance of two dry cross strands CS, as best shown in FIG. 28. The dry cross strands CS are engaged with the wet cross strands CS' in the tube 81 and emerge from the positioning die 82 as a three strand assembly. The cross strands CS are fed to the tube 81 from adjacent magazines 68, but these adjacent magazines do not have adhesive containers 75.

As illustrated in FIGS. 27 and 28, each tube 81 is preferably attached near its lower end to a ring 142 which is in turn held in a fixed position by a series of brackets 143 attached to the drum 61. Fixing the lower end of the tube in this manner provides a more accurate positioning of the cross strands just prior to their juncture with the warp strands WS.

In the present invention the precise positioning of the warp strands and the manner in which the warp strands are maintained in a fixed lateral and vertical position by a minimum number of cross strands permits a fabric having warp strands of uniform length to be produced in which all of the warp strands assume a load simultaneously rather than successively. The most efficient use is therefore made of the physical properties of the strands.

The present invention makes it feasible to use specific materials for specific properties since the precise positioning of the individual strands permits the individual characterstics of the different materials to be reflected in the finished product. Thus, if a higher strength, stiffer fabric is desired, metal strands can be intertwisted with mineral strands in the warp strands and bonded to suitable cross strands. Alternatively, the desired proportion of metal strands can be warp strands and bonded directly to cross strands to produce the desired properties in the completed fabric.

The precise vertical and lateral positioning of fabrics produced by the present invention is especially important in the formation of multiple layer articles formed by winding several layers of fabric on top of one another. In many articles of this kind fabric strength is desired substantially in only a circumferential direction. In such articles cross strands would contribute nothing directly to the strength desired. However, any movement of the circumferential strands inwardly or outwardly from its respective layer develops uneven loads on the strands in that particular layer. A minimum number of cross strands bonded to the main strands in accordance with the present invention is effective to prevent such radial movement between layers and also to provide effective edge restraint without auxiliary apparatus during the formation of a multiple layer article. A better fabric is produced and at lower cost.

A further attribute of the present invention is that metal strands can be oriented and maintained in fixed, separated positions in such multiple layer articles to impart predetermined electrical and magnetic characteristics to the article.

Another aspect of the low adhesive content fabrics produced in accordance with the present invention is that a low shrink, thixotropic resin can be used to impregnate the open mesh of the fabric to add additional position stability to the completed article. This is important for fabrics used to wind armatures having projecting elements which would tend to split the fabric.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of making non-woven fabrics of the kind in which longitudinally extending warp strands are bonded to transversely extending cross strands, said method comprising, moving a plurality of warp strands in a horizontal direction over a stationary support, rotating a magazine containing adhesive in an annular path about the horizontally moving warp strands on the support, passing a cross strand through the magazine to apply adhesive to the cross strands, and engaging the cross strand under tension with the warp strand on the support to bond the warp and cross strands together.

2. A method of forming a non-woven fabric as defined in claim 1 and including, moving a plurality of warp strands in one direction over the support, moving a plurality of cross strands across the warp strands, applying adhesive to certain ones only of the warp strands, applying adhesive to certain ones only of the cross strands, and then engaging the warp and cross strands under pressure.

3. The method of claim 1 including guiding the warp and cross strands to precise positions on the support, exerting constant tension on the strands and a uniform tension on each of the warp strands, applying sufficient adhesive to the side of the cross strand which faces the warp strands to form a filleted adhesive joint between each warp and cross strand and removing substantially all adhesive from the opposite side of the cross strand whereby the non-woven fabric has precisely oriented, uniformly tensioned strands and intersecting joints of maximum area with a minimum amount of adhesive in the completed fabric.

4. The method of claim 1 including passing each of the warp strands under tension over a first concave arc, positioning a second concave arc having a curvature reversed with respect to the first arc radially from the first arc and axially close to the first arc, and passing each warp strand through the second arc whereby the concave surfaces of the arcs effect a stabilized lateral and vertical position of each of the warp strands.

5. A method as defined in claim 1 including supporting, at the time the cross strand is engaged with the warp strands, each of the warp strands on a plurality of closely spaced edges disposed linearly along the direction of movement of the warp strands and inclined at an angle thereto with the spacing between said edges related to the material stiffnesses of and tensions applied to the warp and cross strands to maintain the warp strands in a fixed lateral and vertical position during their longitudinal movement.

6. A method of forming a non-woven fabric as defined in claim 5 including scavenging excess adhesive between said edges to prevent adhesive build up along the support edges.

7. A method of forming a non-woven fabric as defined in claim 5 in which said edges are arranged in an arcuate disposition in a plane perpendicular to the direction of longitudinal movement of the warp strand and including the step of depressing the cross strand in a direction slightly below a line tangent to the point of contact with the arcuate support to wipe adhesive from the outer side of the cross strand just before the cross strand is engaged with the warp strand.

8. Apparatus for continuously producing a non-woven fabric of indeterminate length comprising, warp strand means for moving a plurality of warp strands in a longitudinal, horizontal direction under a controlled tension, positioning means for positioning the warp strands in fixed lateral and vertical positions, fill strand means rotatable in an annular path about the horizontally moving warp strands for laying a fill strand on the warp strands in a helix during longitudinal movement of the warp strands, a magazine containing adhesive mounted on the fill strand means and rotatable with the fill strand means in said annular path about the horizontally moving warp strands, said magazine having entrance and exit means for introducing the fill strand into the adhesive in the magazine as the fill strand passes through the magazine, and stationary strand support means for supporting the engaged warp and fill strands.

9. Apparatus as defined in claim 8 including warp strand roller means mounted for rotation with the magazine and engageable with the warp strands prior to their junction with the fill strands for positioning the warp strands substantially uniformly laterally to minimize yarn defects which would otherwise be produced by individual warp strand breakage and drop out.

10. Apparatus as defined in claim 8 including compacting roller means mounted for rotation with the magazine means and positioned to engage the fill strands on the warp strands prior to initial setting of the adhesive to smooth the yarn by preventing stacking of fill strands.

11. Apparatus as defined in claim 8 including adhesive metering and positioning means at the outlet end of the magazine for removing substantially all adhesive from the side of the fill strand opposite that facing the warp strands.

12. Apparatus as defined in claim 8 in which the stationary strand support means include a tubular member and wherein the fabric is formed as a tubular web about the tubular member and wherein the means for moving the warp strands include friction drive rollers which frictionally engage the inner and outer surfaces of the top, bottom and sides of the tubular web formed about said support means to move the bonded fabric through said apparatus, said drive rollers being mounted in two sets at right angles to one another and being located sufficiently far away from said support means to avoid imposing strains on the junctures between the warp and fill strands while the adhesive is setting.

13. Apparatus as defined in claim 8 wherein said positioning means for positioning the warp strands in fixed lateral and vertical positions include first arc means having concave surfaces for receiving warp strands thereon, second arc means disposed radially from the first arc means and having a concave curvature which is reversed with respect to the first arc means for receiving the warp strands thereon after the warp strands pass through the first arc means, said second arc means being positioned axially close to the first arc means so that each warp strand turns through substantially 90° at the outlet and inlet of the respective first and second arc means to receive lateral and vertical stabilization at the outlet of the second arc means.

14. Apparatus as defined in claim 13 wherein the first arc means comprise a series of radially and circumferentially spaced eyelets for receiving individual warp strands with each eyelet having an internal diameter several times larger than a warp strand with each series of radial eyelets substantially uniformly dividing the circumferential space between a related pair of radially innermost eyelets.

15. Apparatus as defined in claim 13 wherein the second arc means comprise a circular ring affording said concave curvature and having a convex curvature in cross-section on the surface receiving the warp strand to minimize abrasion of the strand during turning of the strand through said 90° angle.

16. Apparatus as defined in claim 8 wherein said entrance means of the magazine project into the magazine from the radially inner side of the magazine so that centrifugal force acting on the adhesive keeps the adhesive away from said entrance means during rotation of the magazine to thereby prevent hardening of adhesive and reduction of the size of the opening at the entrance means.

17. Apparatus as defined in claim 16 in which said entrance means include a die having an internal diameter several times larger than the fill strand to prevent build-up of fibre particles and sizing in the die which could cause the strand to break.

18. Apparatus as defined in claim 8 wherein the exit means include a tube having adhesive metering means at one end of the tube for controlling the amount of adhesive on the strand in the tube and having adhesive positioning means at the opposite end of the tube for removing substantially all adhesive from the side of the fill strand opposite that facing the warp strands.

19. Apparatus as defined in claim 18 including means for imposing a control tension on the fill strands in the magazine and wherein the adhesive positioning means are disposed sufficiently close to the warp strands to minimize build-up of whiskers of fast drying adhesive and to minimize twisting of the fill strand between the outlet of said metering and adhesive positioning means and the juncture with the warp strands.

20. Apparatus as defined in claim 18 in which said adhesive metering means are located substantially on the line which is at the liquid center of the magazine and which extends parallel to the axis of the support.

References Cited
UNITED STATES PATENTS

| | | | |
|---|---|---|---|
| 2,725,323 | 11/1955 | Chadwick et al. | 156—181 X |
| 2,902,395 | 9/1959 | Hirschy et al. | |
| 2,985,220 | 5/1961 | Fry | 156—181 |
| 3,025,205 | 3/1962 | Young | 156—169 |
| 3,037,343 | 6/1962 | Haas et al. | 156—432 X |
| 3,041,230 | 6/1962 | Diehl | 156—172 |

ROBERT F. BURNETT, *Primary Examiner.*

ALEXANDER WYMAN, *Examiner.*

W. A. POWELL, *Assistant Examiner.*